INVENTOR
ADELBERT VAN WEEL

United States Patent Office 2,752,565
Patented June 26, 1956

2,752,565

METHOD AND DEVICE FOR TESTING THE PHASE-CHARACTERISTICS OF NETWORKS

Adelbert Van Weel, Eindhoven, Netherlands, assignor to Hartford National Bank and Trust Company, Hartford, Conn., as trustee Application July 22, 1952, Serial No. 300,139

Claims priority, application Netherlands August 31, 1951

13 Claims. (Cl. 324—57)

The invention relates to methods and devices for testing the phase-characteristics of networks. In a number of cases important properties of networks are dependent upon the phase-characteristic thereof. For example, with networks for use in television relay transmitters the transit time (delay time) may be required to be as constant as possible within a certain frequency range, i. e. it must be independent of the frequency. In this case, the phase-displacement between the input terminals and the output terminals of the network should be proportional to the frequency and the phase-characteristic, which indicates the relationship between this phase displacement and the frequency, should consequently be linear. Deviations from ideal network performance are often due to the phase-characteristic rather than the amplitude characteristic.

Known methods of measuring the phase-characteristics of networks are comparatively difficult, complex and costly in time, particularly if the requirements for accuracy are severe, which, for example, is the case with high frequencies. It may be noted here that with the aforesaid networks for use in television relay transmitters it should be possible to determine the transit time with an accuracy of $10^{-9}$ sec.

The invention has for its object to provide methods and devices whereby the phase-characteristic tests on networks are simplified and accelerated.

According to the method of the invention an alternating voltage of a desired test frequency within the range of frequencies over which the phase-characteristic is required (hereinafter termed the measuring voltage) is supplied by way of a modulator to the network to be tested and is modulated in the said modulator by an auxiliary alternating voltage (hereinafter termed the auxiliary voltage) which has a lower frequency than the test frequency and is produced in a closed circuit comprising the network, a detector following or included in the network, an amplifier for the detector-output having the frequency of the auxiliary voltage, and the modulator, the frequency of the auxiliary voltage being determined. The auxiliary voltage itself preferably transverses only the amplifier. In the modulator it is superimposed as a modulation on the measuring voltage but preferably does not appear at the output; if it does it may be suppressed by a filter. The modulated measuring voltage traverses the network; in the detector the modulation voltage (the auxiliary voltage) is separated from the carrier-wave, the measuring voltage.

The invention is based on the fact that at the frequency produced by a closed loop circuit the total phase-displacement for that frequency must be zero or, what is the same thing, a whole multiple of 360°. If the phase-displacement is varied in one of the elements of the loop circuit the frequency must adjust itself to such an extent that the total phase-displacement for the new frequency has the initial value. Accordingly if the phase-displacement varies with the test frequency in the case of the measuring voltage the frequency of the auxiliary voltage generated in the loop circuit must vary because of the modulation. The modulator and the detector convert the phase-displacement, so to speak, into a corresponding phase-displacement of the auxiliary voltage. Thus the frequency produced in the loop circuit is also determined by the transit time of the network at the frequency of the measuring voltage. By determining the frequency of the auxiliary voltage at a given value of the frequency of the measuring voltage, the phase characteristic of the network can be obtained.

If, when the frequency of the measuring voltage is varied, the transit time of the network varies by an amount $\tau$ and at the same time the frequency $p$ of the auxiliary voltage varies by an amount $\Delta p$, I have found that $$\frac{\tau}{t}=\frac{\Delta p}{p}$$

where $t$ is the total transit time of both the feedback circuit and the network and hence of the whole circuit.

The transit time for the auxiliary voltage in the amplifier is preferably high compared with the transit time for the frequency of the measuring voltage in the network to be tested. In the above formula $t$ may represent with sufficient approximation the transit time of the amplifier instead of the transit time of the whole loop circuit. In this case the transit time is constant and, of course, known. By measuring $p$ and $\Delta p$, $\tau$ can be calculated. It should be noted that in this case $p$ is determined by the properties of the amplifier. In this manner it is possible to test whether or not the transit time of the network exhibits variations in a given frequency range. In order to give an idea of the accuracy obtainable, reference may be made to an experiment conducted by me in which $p=500$ kilocycles per second; $\Delta p=50$ cycles per second and $t=10^{-5}$ sec. It follows therefrom that $\tau=10^{-9}$ sec.

In order that the invention may be more readily carried into effect, it will now be described with reference to the accompanying drawings in which.

Figure 1:
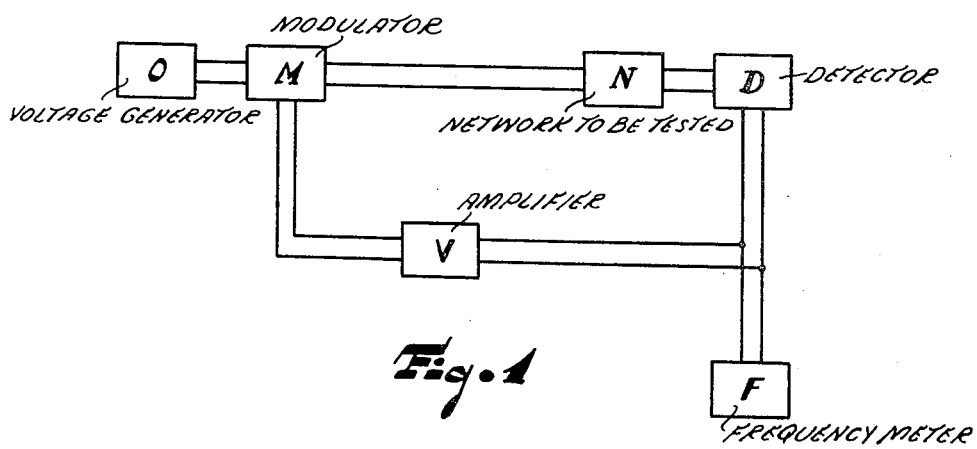
Fig. 1 is a schematic diagram of an embodiment of the device of the present invention.

In Fig. 1, reference letter O designates a generator for the measuring voltage, M a modulator in which the measuring voltage is modulated by the auxiliary voltage, N a network to be tested, D a detector in which the measuring voltage, modulated by the auxiliary voltage, is detected; V an amplifier in which the auxiliary alternating voltage from the detector D is amplified before it is supplied to the modulator M, and F designates a frequency-meter for measuring the frequency $p$ and the frequency variations $\Delta p$ of the auxiliary voltage.

The amplitude of the auxiliary voltage should be limited by means of an amplitude limiter which may be included in the amplifier V. It is necessary to insure that this limiter does not give rise to undue distortion, which would affect the accuracy of measurement. The distortion produced by this limiter is preferably less than 10%.

Figure 2:
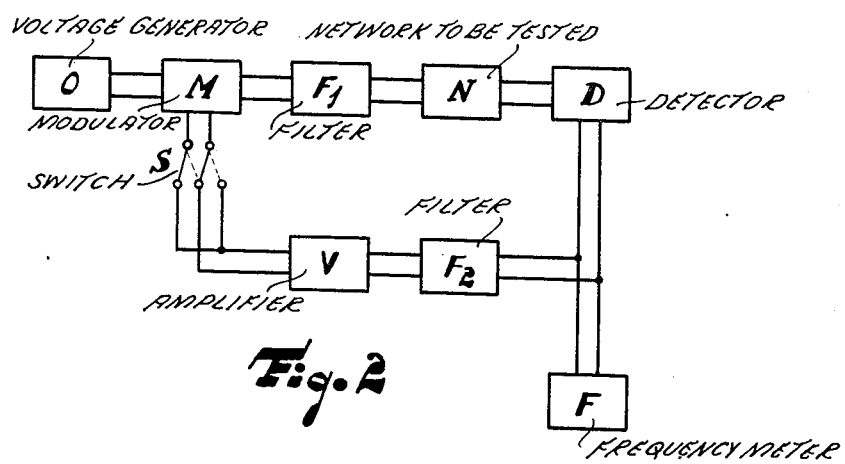
Fig. 2 is a schematic diagram of a modification of the embodiment of the device shown in Fig. 1.

The embodiment shown in Fig. 2 corresponds substantially to that shown in Fig. 1. Corresponding elements are designated by the same reference characters as those of Fig. 1. As compared with the embodiment shown in Fig. 1, there are three points of difference. In the first place a filter $F_1$, which passes only the measuring voltage and the sidebands thereof produced by its modulation by the auxiliary voltage, is provided between the modulator M and the network N to be tested. The auxiliary voltage itself together with any harmonics thereof which may be produced in the modulator and any harmonics of the measuring voltage are strongly suppressed by the filter $F_1$. It has been found that the presence of other voltages at the side of the modulated measuring voltage disturbs the measurement. In the second place a filter $F_2$ is provided. This allows only the auxiliary voltage to pass and suppresses voltages having other frequencies, such, for example, as the measuring voltage and harmonics thereof, which might occur in the output voltage of the detector D. In the third place a switch S is provided. By means of this switch the phase of the auxiliary voltage supplied to the modulator M may be reversed.

A device according to Fig. 1 or 2 comprising an amplifier V having amplitude limitation, a modulator M and a frequency meter F, is suitable for testing the phase-characteristics of networks which themselves include a detector D, as is the case with television receivers. For testing networks which do not comprise a detector, the latter must be added to the device. In the first case it may be that the detector is followed by one or more amplifying stages, which are accordingly traversed by the auxiliary voltage. The phase-displacement of 180° in each stage may always be compensated if necessary by using a switch S and moving it into its correct position.

The limiters which are preferably used with the devices described may be employed to derive a direct voltage from the auxiliary voltage, this direct voltage being used for controlling the amplification of one or more tubes. In this case it is necessary to provide thorough smoothing of this direct voltage, since otherwise the residual ripple voltage occurs across the closed loop circuit and gives rise to phase-displacements. However, when using a high degree of smoothing or, in general, any large time-constant in the control-circuit undue phenomena of instability are liable to occur. For this reason it is in general not permissible to provide more than one RC-network in the smoothing circuit.

The said disadvantage may be obviated by another embodiment of the invention. In this embodiment use is made of a second auxiliary voltage (pilot voltage) having a frequency (pilot frequency) different from that of the auxiliary voltage already considered. Said pilot voltage is employed as a control voltage so that the amplification is determined and controlled automatically in a manner such that the total amplification over the closed circuit remains approximately constant.

Figure 3:
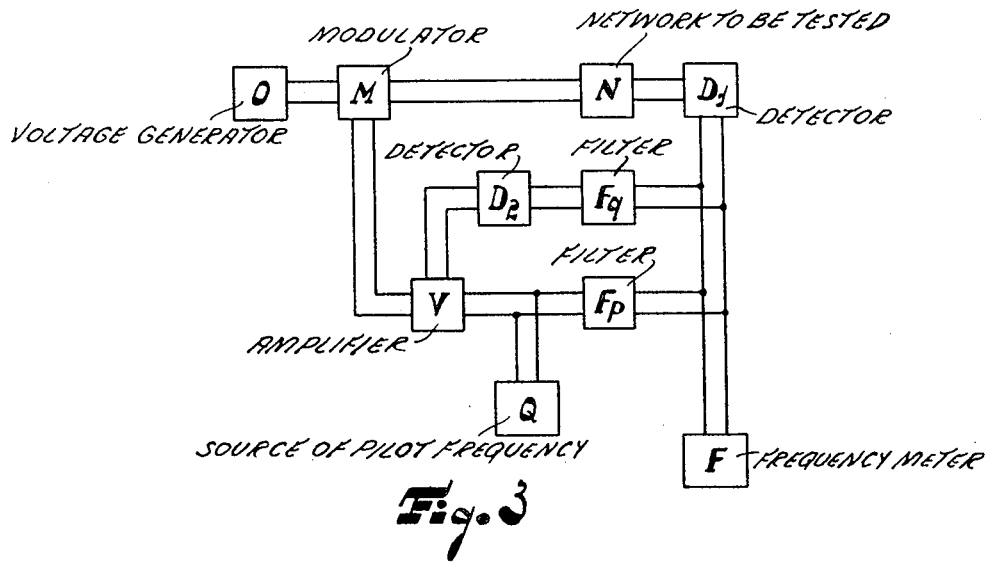
Fig. 3 is a schematic diagram of another embodiment of the device of the present invention.

Fig. 3 is a schematic diagram of another embodiment of the device of the present invention. In Fig. 3, the pilot frequency $q$ from a pilot frequency source Q is derived in a circuit comprising filter $Fq$ and detector $D_2$, the former being connected to $D_1$ and the latter to amplifier V. The detector $D_2$ produces the control-voltage, which is applied to the said amplifier. In order to avoid variations of transit time during the control, this is preferably applied to a stage having a low transit time. Filter $Fp$ corresponds to $F_2$ in Fig. 2 and selects the frequency $p$ while excluding the frequency $q$. Filter $Fq$ selects the frequency $q$ while excluding the frequency $p$.

Figure 4:
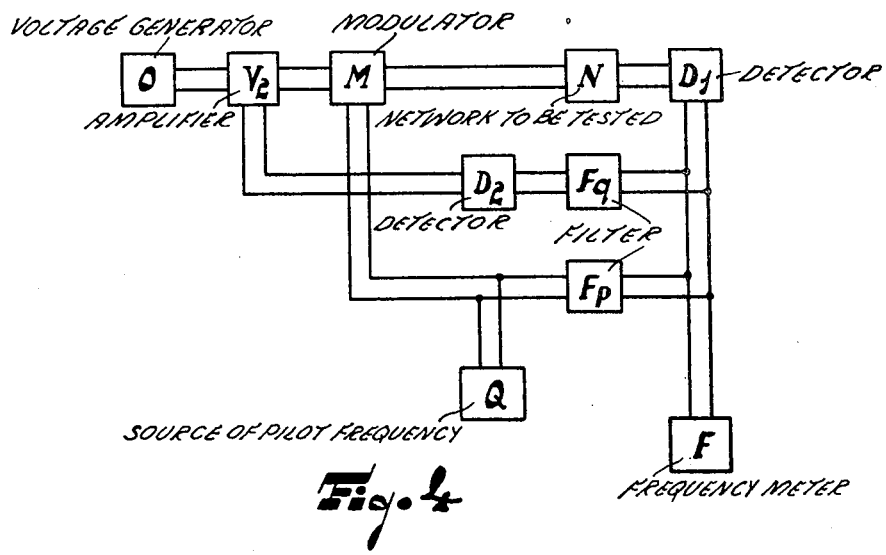
Fig. 4 is a schematic diagram of a modification of the embodiment of the device shown in Fig. 3.

It is sometimes advisable to apply the control to an element which is not included in the closed circuit. Such a device is shown in Fig. 4. Fig. 4 is a schematic diagram of a modification of the embodiment of the device shown in Fig. 3. The device of Fig. 4 comprises elements corresponding to those comprised in the device shown in Fig. 3 except that the control-voltage produced in the detector $D_2$ acts, in this case, upon the output-voltage of the measuring voltage generator O by way of an amplifier $V_2$ connected between said voltage generator and the modulator M, direct output voltage of the detector $D_2$ acting upon said amplifier.

The pilot frequency $q$ preferably differs considerably from the frequency $p$ of the (first) auxiliary voltage so that the separation of the various frequencies may be carried out more easily. The pilot frequency may be higher or lower than the frequency $p$. It is, however, preferred to make the pilot frequency lower so that the influence on the amplification of the carrier-wave in the measured network is optimum.

In cases in which the detector $D_1$ itself supplies a sufficient direct voltage, the latter may be used directly for control. In this event the detector $D_2$ may be dispensed with.

Difficulties may arise with the measurement of the transit time in networks for video-frequency oscillations if the modulator output includes not only the desired high-frequency voltage but also a voltage of the modulation frequency itself. This latter low-frequency voltage will traverse a video-frequency network substantially without being attenuated, so that the signal which reaches the detector comprises two components of the auxiliary voltage of low frequency, i. e. the modulation of the high-frequency measuring voltage, which is desired, and the low-frequency component allowed to pass directly by the modulator, which is not desired. The phase-displacement of the resultant output voltage of the detector then no longer varies solely with the phase-displacement to which the modulated measuring voltage is subjected.

Figure 5:
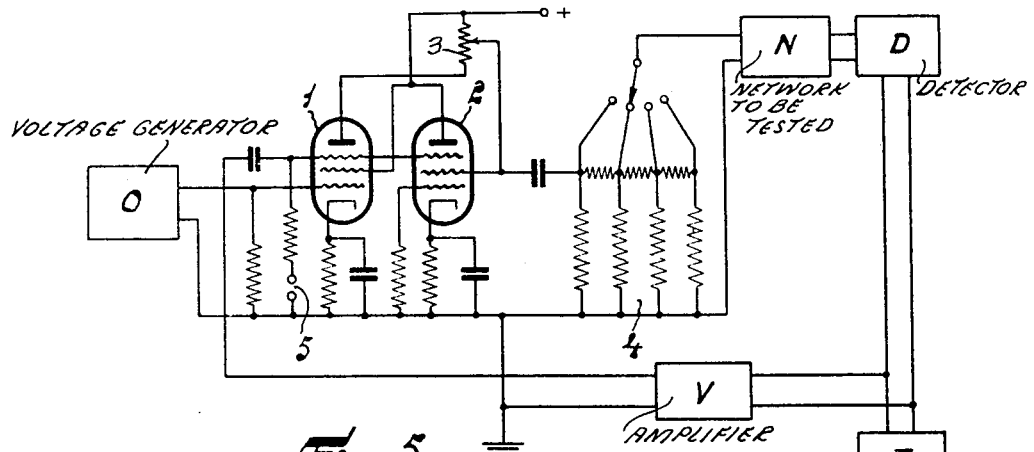
Fig. 5 is a schematic diagram of the embodiment of the device shown in Fig. 1, including a suitable modulator circuit.
Figure 6:
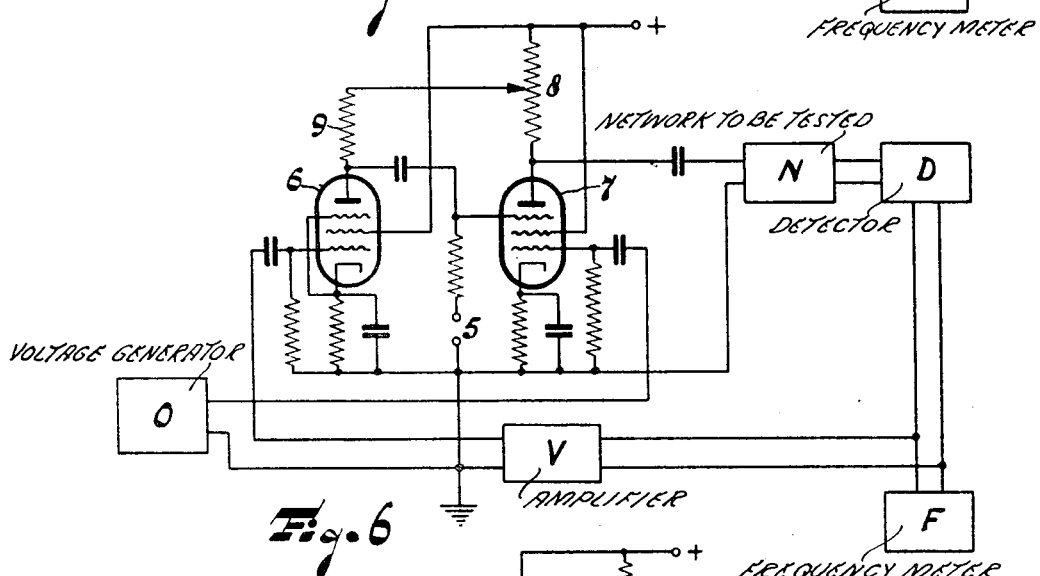
Fig. 6 is a schematic diagram of the embodiment of the device shown in Fig. 1, including a suitable modulator circuit.
Figure 7:
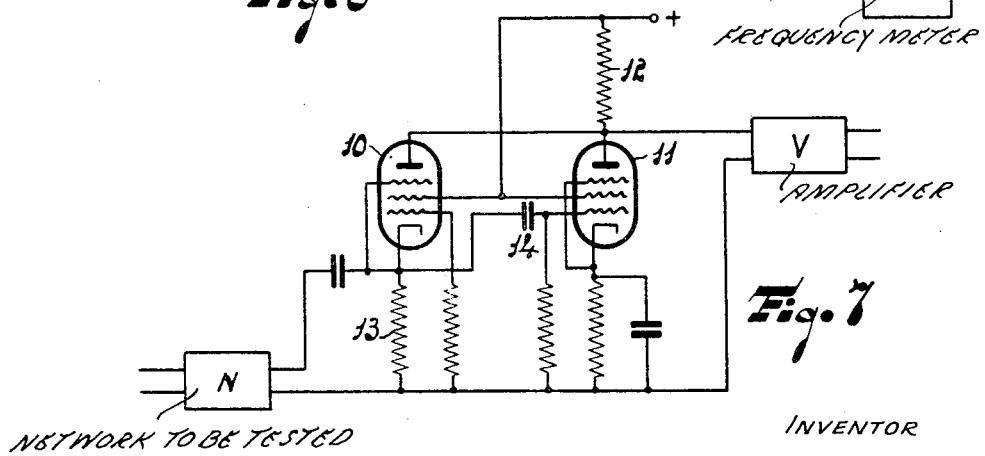
Fig. 7 is a schematic diagram of a suitable detector circuit.

Devices in which this possible disadvantage is obviated are shown in Figs. 5, 6 and 7. In these cases the unwanted alternating voltage is attenuated without the occurrence of an excessively large phase-displacement of the desired voltage of modulation frequency.

The attenuation should amount at least to a factor 10, which corresponds to about 20 db. It is not essential that the unwanted voltage should be reduced more than this, since for most uses the unwanted low-frequency voltage that is allowed to pass directly may extend to 10% of the detected voltage without detrimental effect.

Fig. 5 is a schematic diagram of the embodiment of the device shown in Fig. 1, including a suitable modulator circuit. In Fig. 5, O designates the generator of the measuring voltage; the frequency thereof may, for example, be varied between 100 kilocycles per second and 10 megacycles per second. This measuring voltage is modulated by means of the auxiliary voltage in the manner described hereinafter. The modulated measuring voltage is conducted through the video-frequency network N to be tested. The modulated measuring voltage is then detected in the detector D. In the amplifier V the auxiliary voltage taken from the detector D is amplified, before it is supplied to the modulator. The frequency $p$ of the auxiliary voltage may be of the order of 30 kilocycles per second.

The modulator comprises two amplifying tubes 1 and 2, constructed in the form of pentodes. The anode of tube 1 is connected through a potentiometer resistor 3 to the positive terminal of the supply source. The anode of tube 2 is connected directly to said source. The auxiliary voltage occurring across the output circuit of the amplifier V is supplied to the suppressor grids of the two tubes. A bias-voltage source for these grids is connected at 5. The cathode leads include the conventional parallel combinations of resistors and capacitors, producing a control-grid bias voltage. The measuring voltage is supplied to the control-grid of the tube 1. The control-grid of tube 2 is connected to ground via a resistor.

The tubes have identical adjustments. The auxiliary voltage controls the current distribution between the screen grid and the anode of each tube. The alternating anode voltage and the alternating screen grid voltage of tube 2 consequently have opposite senses. By means of the potentiometer 3, the sliding contact of which is connected to the screen grid of tube 2, the anode current of the first tube is combined with the screen grid current of the second tube in such manner that the modulating frequency is eliminated from the output signal which is taken from the screen grid of tube 2. Between the output circuit of the modulator and the network N provision is made of an attenuator 4, having four positions and comprising only resistors so that it produces no additional phase-displacement. It is desirable to provide the attenuator at this position and not to connect it, for example, in front of the modulator in order that the modulated voltage and the residual unwanted modulation may be attenuated to the same extent.

Fig. 6 is a schematic diagram of the embodiment of the device shown in Fig. 1, including a suitable modulator circuit. With the modulator shown in Fig. 6 two pentodes 6 and 7 are provided; the anode circuit of the latter includes a potentiometer resistor 8 whose tapping point, which may be slidable or not, is connected through resistor 9 to the anode of tube 6. The upper part of the resistor 8, consequently, conveys the anode current of tube 6. The alternating voltage across the resistor 9 controls the anode current of tube 7 via the suppressor grid thereof. The modulation voltage from the amplifier V is supplied to the first grid of tube 6 and the measuring voltage from the voltage generator O to the first grid of tube 7. With this arrangement it is also possible to eliminate the auxiliary voltage from the output circuit of the modulator.

Fig. 7 is a schematic diagram of a suitable detector circuit and shows a detector in which the auxiliary alternating voltage is suppressed in the output circuit. The signal to be detected and originating from the network N is supplied to a resistor 13, which is connected between the cathode of tube 10 and ground. This resistor is also conected in series with a capacitor 14 between the grid of tube 11 and ground. The cathode of tube 11 is connected to ground through the parallel combination of a resistor and a capacitor. The first control-grid of tube 10 is also connected to ground through a resistor. Consequently the two tubes have substantially the same high-frequency alternating voltage between the control-grid and the cathode, but in phase opposition. For direct current the tubes have identical adjustments.

The input voltage is given such a high value that, owing to the grid voltage-anode current characteristic, detection occurs in the tubes. The anodes are connected through a common resistor 12 to the positive terminal of the supply source. With quadratic detection no voltage occurs across the output circuit due to any low-frequency voltage from the modulator across the input circuit.

It is to be understood that the invention is not limited to the details disclosed but includes all such variations and modifications as fall within the spirit of the invention and the scope of the appended claims.

What I claim is:

1. Apparatus for testing the phase characteristic of a network, said apparatus comprising a modulator having its output connected to the input of said network, an alternating measuring voltage source, means applying said measuring voltage to the input of said modulator, a detector coupled to the ouput of said network, and amplifying means coupling the output of said detector to the input of said modulator to produce a predetermined auxiliary oscillation therein having a frequency lower than that of said measuring voltage to combine with said measuring voltage.

2. Apparatus, as set forth in claim 1, wherein said amplifying means has a large transit time for said auxiliary oscillation compared with the transmit time of said network for said measuring voltage.

3. Apparatus, as set forth in claim 1, wherein said amplifying means provide amplitude limitation, said limitation producing a distortion of less than 10%.

4. Apparatus, as set forth in claim 1, further including a frequency meter coupled to the output of said detector.

5. Apparatus, as set forth in claim 1, wherein said modulator is a push-pull modulator, said modulator having an output impedance providing the same phase-displacement for the auxiliary oscillation and the modulation.

6. Apparatus, as set forth in claim 1, wherein said detector has a characteristic at which the unwanted auxiliary oscillation is substantially not allowed to pass.

7. Apparatus, as set forth in claim 1, wherein said detector is a push-pull detector.

8. Apparatus, as set forth in claim 1, further including an attenuating device interposed between said modulator and said network.

9. Apparatus for testing the phase characteristic of a network, said apparatus comprising a modulator having its output connected to the input of said network, an alternating measuring voltage source, means applying said measuring voltage to the input of said modulator, a detector coupled to the output of said network, amplifying means coupling the output of said detector to the input of said modulator to produce a predetermined auxiliary oscillation therein having a frequency lower than that of said measuring voltage to combine with said measuring voltage, a first filter circuit interposed between said modulator and said network for passing said combined voltage but suppressing said auxiliary oscillation, and a second filter circuit interposed between said detector and said modulator for passing said auxiliary oscillation but suppressing said combined voltage.

10. Apparatus, as set forth in claim 9, further including switching means for changing the phase of said auxiliary oscillation by 180°, said switching means being interposed between said amplifying means and said modulator.

11. Apparatus for testing the phase characteristic of a network, said apparatus comprising a modulator having its output connected to the input of said network, an alternating measuring voltage source, means applying said measuring voltage to the input of said modulator, a first detector coupled to the output of said network, amplifying means coupling the output of said first detector to the input of said modulator to produce a predetermined auxiliary oscillation therein having a frequency lower than that of said measuring voltage to combine with said measuring voltage, a pilot frequency source coupled to the output of first detector, the frequency of said pilot frequency having a value other than that of said auxiliary oscillation, a second detector, a first filter circuit coupled between the output of said first detector and the input of said second detector, said first filter circuit passing said pilot frequency, the output of said second detector being coupled to said amplifying means to provide constant amplification, and a second filter circuit interposed between said pilot frequency source and said first detector, said second filter circuit passing said auxiliary oscillation.

12. Apparatus, as set forth in claim 11, wherein said amplifying means amplify said measuring voltage.

13. Apparatus, as set forth in claim 12, wherein the control voltage is derived from the output of said first detector.

References Cited in the file of this patent

UNITED STATES PATENTS

| | | |
|---|---|---|
| 2,006,698 | Peterson | July 2, 1935 |
| 2,257,594 | Chireix | Sept. 30, 1941 |